United States Patent

[11] 3,591,921

[72] Inventor David F. Cosper
Dallas, Tex.
[21] Appl. No. 763,787
[22] Filed Sept. 30, 1968
[45] Patented July 13, 1971
[73] Assignee Varo Inc.

[54] METHOD FOR MAKING RECTIFIER STACKS
5 Claims, 5 Drawing Figs.

[52] U.S. Cl. .......... 29/583, 83/29
[51] Int. Cl. .......... B01j 17/00, H01l 7/66
[50] Field of Search .......... 29/576, 583, 411; 317/234, 235; 83/29

[56] References Cited

UNITED STATES PATENTS

| | | | |
|---|---|---|---|
| 2,865,082 | 12/1958 | Gates | 29/583 |
| 2,968,866 | 1/1961 | Soper et al. | 29/583 X |
| 3,274,454 | 9/1966 | Haberecht | 317/234 |
| 3,422,527 | 1/1969 | Gault | 29/583 X |
| 3,488,835 | 1/1970 | Becke et al. | 29/583 X |

*Primary Examiner*—John F. Campbell
*Assistant Examiner*—W. Tupman
*Attorney*—Olson, Trexler, Wolters & Bushnell

ABSTRACT: A method for making rectifier stacks is disclosed wherein a plurality of wafers of semiconductor material, each of which has a PN junction formed therein, are bonded together to form a stack with the PN junction and the wafers substantially parallel. Parallel, spaced-apart cuts are made through the stack substantially normal to the PN junctions of the wafers dividing the stack into a plurality of slices, each of which has a plurality of substantially parallel series-connected PN junctions therein. Each slice is mounted on a mounting plate and parallel cuts are made through each of the slices substantially normal to the PN junctions cutting each slice into a plurality of stacks of die of the desired junction area. Electrical connection is then made to each end of the stack of die to form a rectifier stack which provides an equivalent function to a group of series-connected individual rectifiers.

PATENTED JUL 13 1971

3,591,921

INVENTOR
DAVID F. COSPER

Arthur M. Sloan

ATTORNEY

METHOD FOR MAKING RECTIFIER STACKS

Recent years have seen the advent of many solid-state elements in such appliances, such as television and radio. Television has been one of the last appliances in which solid-state devices fully replace gas or vacuum tubes. This is due, in part, to the fact that extremely high voltages are developed across certain parts of the television circuitry. One element in particular that has been expensive and difficult to produce in the solid-state form is the high voltage rectifier commonly associated with the flyback transformer. In normal operation, this element must be able to withstand a peak inverse voltage in the order of 35,000v. or higher applied across the terminals.

It is known that solid-state rectifiers are not individually able to withstand voltages of this magnitude, but that a plurality of individual rectifiers can be connected in a series to form a rectifier stack capable of withstanding the extremely high-peak inverse voltage without an extensively high forward voltage drop. For example, if a voltage of 35,000 v. is applied across a stack of 350individual rectifiers the junction in each of the individual rectifiers is subjected to a potential of only 1,000 v. This solution appears simple enough, but unfortunately the stacked rectifiers are difficult to produce, and are quite expensive if conventional manufacturing processes are used in their manufacture.

To fully understand the problems that must be overcome in producing rectifier stacks, consideration must be given to the extremely small size of the completed rectifier stack. For example, it will be appreciated that rectifier stack is suitably square and in the order of 0.015 to 0.050inch on a side. The length of rectifier stack is, of course, dependent upon the number of junctions which must be provided in a stack. The wafers used in forming the stacks are, for example, approximately 15 mils thick. Accordingly, the length of the stack will be slightly greater than 15 mils multiplied by the number wafers used. Several hundred to in excess of one thousand rectifier stacks can be cut from a single stack formed of wafers about one and one quarter inch in diameter.

It is conventional in the dicing or cutting of wafers to mount the wafers on a cutting plate and to make parallel spaced-apart cuts across the wafer in one direction. The wafer is then rotated 90° and additional cuts made at right angles to the first cut. However, when this technique is used on stacks of wafers several wafers high, it has not proved successful. For example, if the particular rectifier stack desired requires 20 PN junctions, the length of the stack will be approximately .35 inch. The first cut through the stack can be made successfully. However, when the stack of wafers is rotated 90° and the next cut commenced, a large number of the stacks of die will be broken and individual stacks of die so severely damaged to be unusable. It has been found that such will be the case even if the space created by the first cut is filled with wax or other material in an effect to stabilize the remaining material or if the slices are pressed together to reduce the space.

In accordance with the present invention, wafers of prepared semiconductor material are first bonded together in series in a unitary stack with an electrically conductive and preferably resilient bonding agent such as soft solder. The stack is formed such that the major planes of each of the wafers are parallel to one another and with the bonding agent serving to connect the P-type conductivity portion of one slice with the N-type conductivity portion of the immediately adjacent slice. The stack of wafers is then placed on a mounting surface and a plurality of parallel, spaced-apart cuts made through the stack substantially perpendicular to the major planes of an individual wafer. These cuts divide the unitized stack into a number of slices of semiconductor material each of which includes a plurality of PN junctions having the same relationship as in the stack of wafers. Each of the semiconductor slices is then placed on a mounting surface with the major plan thereof parallel to the surface and a number of parallel cuts are again made through the strips perpendicularly to the PN junctions therein. These cuts, serve to divide the strips into stacks of die which form the desired rectifier stacks when electrical connection is made to each end thereof.

Many of the objects, features and advantages of the invention defined in the claims will become apparent to those persons skilled in the particular art from the following detailed description of a preferred embodiment of the invention when taken in conjunction with the accompanying drawing wherein like reference numerals denote like parts and in which:

Figure 1:
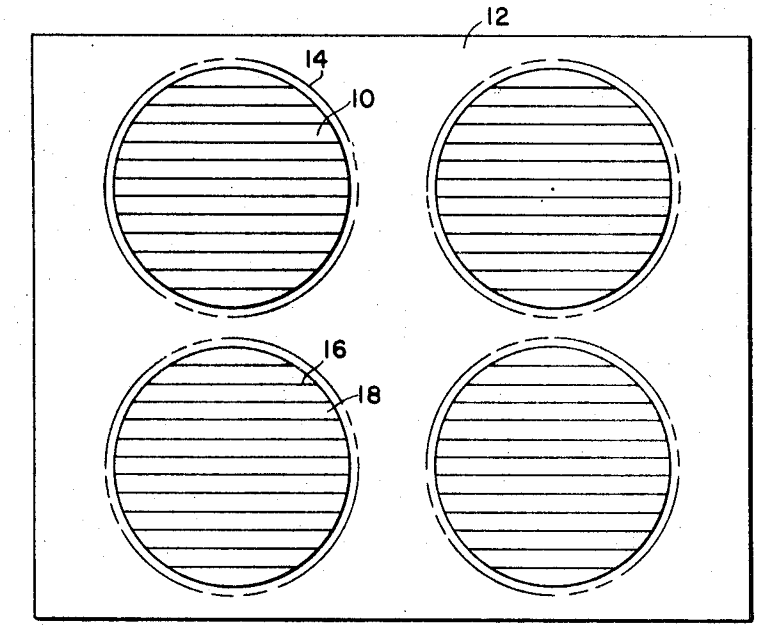
FIG. 1 is a plan view of four stacks of wafers of semiconductor material mounted on a mounting surface in preparation for cutting.
Figure 2:
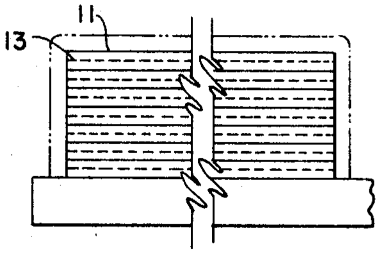
FIG. 2 is a side elevation view of one of the stacks of wafers shown in FIG. 1.

Referring again to the drawings, FIG. 1 is a top view of four unitized stacks 10 of semiconductor wafers 11 mounted on a plate 12. Each of the wafers of semiconductor material in each stack has been properly prepared by having impurities diffused therein creating a PN junction 13 in each slice as shown in FIG. 2. The slices have been bonded together to form a unitized stack with a conductive and somewhat resilient bonding agent, preferably soft solder. As mentioned, the slices are stacked together with their major planes and the planes of their PN junctions substantially parallel to one another and with the bond agent serving to electrically connect the P portion of one slice with the N portion of the immediately adjacent slice. After being so prepared, the stacks are placed on a mounting surface as shown in FIGS. 1 and 2 with the major planes of the individual slices and the planes of the PN junctions therein being substantially parallel to the surface of the mounting surface 12. The unitized stacks 10 are preferably attached to the mounting surface 12 with wax in phantom as indicated at 14, so that they may be easily removed.

After the stacks 10 are attached to the mounting surface, a plurality of parallel vertical cuts 16 are made through the stacks 10. These cuts are perpendicular to the major planes of the individual wafers forming the stacks and to the PN junctions formed in the wafers. The cuts 16 are spaced apart substantially equal distances and extend completely through the stack. The spacing between cuts 16 establishes one dimension of the desired stack of die. It has been found that an abrasive saw having a plurality of blades spaced equal distances apart is particularly adapted for this cutting operation as it applies substantially no pressure to the stacks of wafers, minimizing breakage.

The cuts 16 serve to divide each stack into a number of slices 18 with each slice comprising strips 19 cut from the wafers forming the unitized stack 10 from which it was cut. In the particular example shown in FIG. 1, 12 cuts are made through each of the stacks and therefore each stack is divided into 13 slices 18.

Each individual strip 18 is then removed from the first mounting plate 12 and placed on a second mounting plate 20. The slice 18 is placed on the surface of plate 20 with its major plane parallel to the plane of the surface 20 and thus the planes of the PN junctions contained in each slice are substantially perpendicular to the plane of the surface 20. As was the case with the stacks shown in FIG. 1, the slices 18 are preferably attached to the mounting surface 20 with wax 22 to hold the slices in place as it is being cut and to facilitate easy removal of the stacks of die cut from the slices 18.

Figure 3:
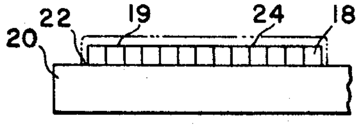
FIG. 3 is a side elevation view of one slice of semiconductor material cut from the stacks shown in FIG. 1, mounted on a mounting surface in preparation for cutting.

After attachment of the slice to the mounting surface 20, a plurality of parallel cuts 24 are made through the slice 18. As shown in FIG. 3 and also in FIG. 4, which is a top view of the strip shown in FIG. 2, the cuts 24 are perpendicular both to the plane of the surface 20 and to the PN junctions 26 contained in the slice 18. The cuts 24 are preferably made with a multibladed abrasive saw of a type having blades that are parallel and spaced equal distant apart. If the cuts 24 dividing the strips 18 into the completed rectifier stacks are suitably spaced apart the same distance as the cuts 16 dividing the unitized stacks 10 into slices the completed stacks 30 of die will have a square cross section. After making the cuts 24 through the slice 18, the stacks 30 of die are removed from the mounting surface 20 and any remaining wax cleaned off of them.

Figure 5:
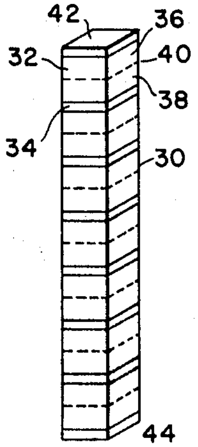
FIG. 5 is a perspective view of a completed stack of die cut from a unitized stack of slices.

FIG. 5 is a perspective view of a stack 30 of die cut from the strip 18 shown in FIGS. 2 and 3. This particular example shows seven individual die 32 bound together at junctions 34. The stacks 10 shown in FIG. 1 each contain seven separate slices of prepared semiconductor material bonded together into the unitized stacks. As also shown in FIG. 5 each of the die 32 contains a P-type conductivity region 36 and a N-type conductivity region 38 forming a PN rectifying junction 13.

Figure 4:
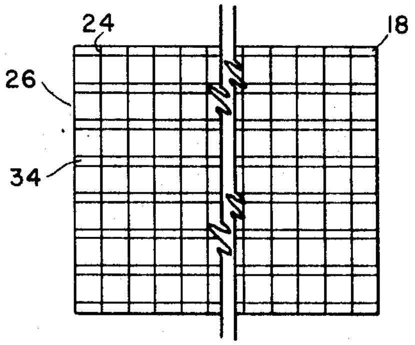
FIG. 4 is a plan view of a slice as shown in FIG. 3.

It will be appreciated that as each of the individual rectifier die 32 shown in FIG. 4 are of approximately cubical shape and since there are seven die in this particular example, the stack 30 is approximately seven times as long as it is wide. As mentioned previously, the semiconductor material from which the rectifier stacks are made is extremely brittle and hard to cut. By cutting the unitized stacks 10 first into strips 18 and then laying the strips 18 on their sides to be cut into the finished rectifier stacks 30, and by bonding the individual slices of semiconductor material together with a somewhat resilient bonding material such as soft solder the possibility of breakage is greatly reduced. Moreover, by use of this method, it is easier to produce a rectifier stack having a uniform cross section that would be the case if the rectifier stacks were cut from the unitized stacks all in the same operation and while remaining in the vertical position as shown in FIG. 1.

For use of the stack 30, one contact is attached to the top surface 42 and a second to the bottom surface 44 to form a rectifier stack. As the individual die 32 in the rectifier stack are electrically connected together in series by the bonding agent 34 a potential applied between the surface 42 and 44 will be equally divided among each of the die 32. For example, if a potential of 7,000 v. were to be applied between the surfaces 42 and 44, the potential applied across each PN junction 40 in the rectifier stack would be only about 1,000 v.

Although this invention has been described with respect to a particular preferred embodiment thereof, many changes and modifications will become apparent to those skilled in the art in view of the foregoing description which is intended to be illustrative and not limiting of the invention defined in the appended claims.

What I claim is:

1. A method of making rectifier stacks comprising the steps of:

a. bonding together with conductive material a desired number of wafers of semiconductor material, each of said wafers having a PN junction formed therein with the plane of said PN junction substantially parallel to the major plane of said wafer whereby to form a stack of said wafers;
b. affixing said stack of wafers to a mounting plate with the plane of said plate substantially parallel to the planes of said PN junctions;
c. making a plurality of simultaneous parallel spaced-apart cuts through said unitized stack substantially normal to said PN junctions to divide said unitized stack into a plurality of slices, each having the same number of PN junctions as said unitized stack;
d. affixing said slices to a mounting surface with the major plane of said slices parallel to the plane of said surface and the plane of each PN junction normal to said surface;
e. making a plurality of simultaneous parallel spaced-apart cuts through said slices substantially normal to said PN junctions and to the plane of said mounting surface, thereby dividing said slices into a plurality of stacks of die; and
f. providing electrical connectors to each end of said stack of die.

2. A method as defined in claim 1 wherein said semiconductor slices are banded together with a resilient, conductive material.

3. A method as defined in claim 1 wherein said semiconductor slices are bonded together with soft solder.

4. A method as defined in claim 1 wherein said unitized stack and said semiconductor slices are cut with an abrasive saw.

5. A method as defined in claim 1 wherein said unitized stack and said semiconductor strips are affixed to said mounting surface with a wax material.

UNITED STATES PATENT OFFICE
CERTIFICATE OF CORRECTION

Patent No. 3,591,921 Dated July 13, 1971

Inventor(s) David F. Cosper

It is certified that error appears in the above-identified patent and that said Letters Patent are hereby corrected as shown below:

Column 1, line 21, change "350" to --thirty-five--;
Column 4, line 34, change "banded" to --bonded--.

In the references, change the class and subclass in the Haberecht patent from "317/234" to --29/576--.

Signed and sealed this 18th day of January 1972.

(SEAL)
Attest:

EDWARD M.FLETCHER,JR.
Attesting Officer

ROBERT GOTTSCHALK
Acting Commissioner of Patents